3,341,412
METHODS OF TREATING SCHIZOPHRENIA

Paul Francis O'Hollaren and Frederick Lemere, Seattle, Wash., assignors to Enzomedic Laboratories, Inc., a corporation of Washington
No Drawing. Filed Mar. 4, 1966, Ser. No. 531,741
10 Claims. (Cl. 167—65)

This invention is concerned with methods of treating schizophrenia and more particularly, it relates to the use of diphosphopyridine nucleotide (hereinafter referred to as DPN) for the treatment of various forms of schizophrenia such as anxiety tension states, manic depressive psychosis and mixed forms of these emotional problems in humans.

Schizophrenia is defined as a severe psychotic disorder characterized by progressive withdrawal from the environment accompanied by a regression and deterioration of emotional response. The schizophrenia reaction is characterized by progressive withdrawal from contact with persons and activities in the environment and regression to a child-like or infantile type of feeling or acting. This is displayed as an inadequate or inappropriate emotional response to situations.

Anxiety tension is described as a more or less emotional illness characterized by direct subjective experiencing of anxiety, manifested most frequently as apprehension, tension, fatigue (often sudden) and panic, which may be accompanied by sweating, palpitation and other physical manifestations of acute fear. Manic-depressive psychosis is characterized by alternating periods of mania and depression, but some patients exhibit only one phase, which may be either depression or elation.

One object of the present invention is to provide compositions which can be readily and conveniently administered to humans afflicted with schizophrenia, anxiety tension states, manic depressive psychosis and mixed forms of these emotional problems. A second object is to provide methods of administering the compositions hereinafter disclosed which are simple and effective in counteracting the symptoms of schizophrenia and various forms thereof. Other objects will become apparent from the specification and appended claims.

This invention is predicated upon the discovery that DPN is extremely effective in counteracting the symptoms of schizophrenia and manifest forms thereof such as anxiety tension states, manic depressive psychosis and mixed forms of these emotional problems, when internally administered to a human orally, rectally, intramuscularly or intravenously in combination with a non-toxic, pharmaceutical, liquid or solid carrier. DPN is a coenzyme which can be isolated from fresh baker's yeast and is commercially available as a white powder freely soluble in water. Thus, it can be readily dissolved in sterile, isotonic, aqueous saline solution and conveniently administered intravenously or intramuscularly to a living host suffering from the effects of schizophrenia, anxiety tension states, manic depressive psychosis and mixed forms of these emotional problems. DPN in a gelatin capsule is recommended for oral or rectal use for effective treatment of the symptoms encountered.

In preparing compositions suitable for use in the practice of the invention, DPN can be mixed with such substances as water, lactose, starch, stearic acid, magnesium stearate, talc, vegetable oils, benzyl alcohol, gum, wax, propylene glycol or the like. Such compositions should be in liquid form as solutions, suspensions or emulsions for intravenous or intramuscular injections to which can be added preserving agents, stabilizing agents, wetting agents, emulsifying agents, buffers or salts to adjust the pH or vary the osmotic pressure. For rectal use, DPN in combination with any of the foregoing liquid or solid carriers can be sealed in a gelatin capsule. For oral use, one can employ a similar gelatin capsule or compress DPN with a solid carrier in the form of a tablet which is enteric coated with cellulose acetate phthalate or the like.

Various dosages of the foregoing compositions can be employed depending upon the route of administration. Intravenously, it is preferable to dissolve from 500 milligrams to one gram of DPN in 200 to 300 milliliters of buffered, aqueous, saline solution and administer same by the well-known drip technique at a rate of from 20 to 35 drops per minute. This dosage can be repeated twice or more times daily as necessary to restore the patient to normalcy within 3 to 10 days. Intramuscularly, from 100 to 200 milligrams of DPN dissolved in about 3 milliliters of buffered aqueous solution is injected in a single dose and repeated every 2 or 3 hours until the host is no longer suffering from the effects of schizophrenia, anxiety tension states, manic depressive psychosis and mixed forms of these emotional problems. Rectally, the dosage should be from 500 milligrams to one gram of DPN repeated at least twice daily. Orally, one should give from 1 to 4 grams of DPN daily in a gelatin capsule or enteric coated tablet for a week or more until the patient has recovered from schizophrenia, anxiety tension states, manic depressive psychosis and mixed forms of these emotional problems. Since DPN is substantially non-toxic, there is very little danger in overdosage. In any event, the minimum dosage should be one gram of DPN daily regardless of the mode of administration. More rapid and dramatic effects are observed at higher dosages of from 3 to 5 grams daily.

The following examples illustrate the methods and compositions contemplated to be within the scope of the present invention.

Example 1

A 24 year old female was admitted to the hospital in a severe schizophrenic reaction, being in an acutely nervous state. The patient demonstrated a marked disassociation between her emotional responses and various situations. There was a definitely inferior affective capacity resulting from the personality disorganization. The patient talked constantly of her deceased father and continually blamed herself for her father's death, even though she was not involved. She demonstrated a marked hostility to her mother even though she had not worked for 3 years and was totally dependent upon her mother for support. The patient was administered one gram of DPN daily in divided doses orally in capsule form and in 4 days there was a marked improvement in the patient's general attitude. From her withdrawn state, she began to communicate freely with the other patients and was obviously in closer contact with her environment. She stopped her incessant mumbling about her being responsible for her father's death and her mood began to reflect the response to her environment. Her appetite improved and she quickly showed evidence of a marked increase in physchic energy. She began to sleep without sedation and at the end of 15 days her improvement was so dramatic that she was discharged to her home with instructions to continue on a maintenance dose of one gram of DPN daily by the oral route. Her condition continued to improve and she eventually returned to work.

Example 2

A 50 year old female was admitted to the hospital in a severe state of depression and nervousness. She was preoccupied with thoughts of death and continually blamed herself for her unhappy condition. She was unable to sleep and complained of generalized aches and pains. Any attempts on the part of the hospital personnel or other patients to assist her were met with an agitated response and nothing seemed to give her relief from her distressed state. The patient was started on DPN in an amount of two grams orally daily in divided dosage. After 4 days there was a marked improvement in the patient's general mood and attitude. Her severe depression had noticeably lifted, the patient began to communicate with members of the staff and other patients and the constant self-accusations and criticisms began to disappear. The heavy sedation required for sleep was discontinued and after 10 days the patient was able to laugh and communicate freely with others. There was a marked improvement in the patient's appearance, appetite, general strength and muscle tone. At the end of 13 days, the patient's improvement was so dramatic that she was discharged from the hospital to her home and was instructed to continue on the DPN in the prescribed dosage of 400 milligrams morning and noon. She continued to improve, returned to work and at the end of 4 months was able to take a vacation alone.

*Example 3*

A 56 year old female was admitted to the hospital in a state of severe anxiety reaction with marked fatigue, depression and emotional instability. She was convinced that her heart was failing her, that she was soon to die, and that life was not worth living. She had a marked flight of ideas, was extremely restless and nervous and her mood varied rapidly from severe depression to giddy superficiality. She was convinced that her husband was going to leave her and since she was so greatly fatigued she would be unable to work to support herself and would undoubtedly starve to death. The patient was given 500 milligrams of DPN in 300 milliliters of saline solution intravenously twice daily and at the end of 3 days there was a dramatic improvement in her condition. The patient's marked anxiety and feeling of impending disaster disappeared overnight. The multiple aches and pains and the severe weakness disappeared and the patient began to communicate freely with other patients. Her appetite improved and she was able to sleep without the sedation for the first time in months. She was acutely aware of her new strength and was delighted with the disappearance of the fatigue which had plagued her only 4 days before. At the end of 10 days, her condition had improved so much that she was discharged to her home and returned to work within 3 days, thereby giving a concrete demonstration of the degree of her recovery by being able to bear the responsibilities of her previous position.

Similar effects as described in the foregoing examples are observed when DPN is administered rectally to schizophrenics in the form of a gelatin capsule containing from 100 to 1000 milligrams of DPN in a minimum dosage of one gram daily. Although the examples show a dosage of no less than one gram of DPN daily, it is preferable to employ from 3 to 5 grams daily until the patient returns to normalcy and then maintain such patient on the minimum dosage of about one gram per day depending upon the individual response to the prescribed treatment.

Likewise, from 200 to 500 milligrams of DPN dissolved in 3 to 5 milliliters of a sterile, pyrogen free, liquid carrier can be injected intramuscularly in a minimum amount of one gram daily to obtain beneficial effects in patients afflicted with schizophrenia or other manifest forms thereof.

We claim:

1. A method of treating schizophrenia which comprises internally administering to a patient evidencing symptoms of schizophrenia a therapeutic composition containing diphosphopyridine nucleotide in an amount sufficient to reduce said symptoms and return the patient to a normal state.

2. A method as claimed in claim 1 in which the composition is administered intravenously.

3. A method as claimed in claim 1 in which the composition is administered intramuscularly.

4. A method as claimed in claim 1 in which the composition is administered orally in unit dosage form.

5. A method as claimed in claim 1 in which the composition is administered rectally in capsule form.

6. A method as claimed in claim 1 in which the composition is administered intravenously in a daily dosage of at least one gram of diphosphopyridine nucleotide dissolved in an aqueous normal saline solution.

7. A method as claimed in claim 1 in which the composition is administered orally in unit dosage form in a daily dosage of at least one gram of diphosphopyridine nucleotide.

8. A method as claimed in claim 1 in which the composition is administered intramuscularly in a daily dosage of at least one gram of diphosphopyridine nucleotide dissolved in an aqueous buffered saline solution.

9. A method as claimed in claim 1 in which the composition is administered rectally in capsule form in a daily dosage of at least one gram of diphosphopyridine nucleotide.

10. A method as claimed in claim 1 in which the composition is internally administered in a daily dosage of from 2 to 5 grams of diphosphopyridine nucleotide.

References Cited

UNITED STATES PATENTS 3,158,540  11/1964  O'Hollaren _____ 167—55

ALBERT T. MEYERS, *Primary Examiner.*

STANLEY J. FRIEDMAN, *Assistant Examiner.*